US012791137B2

(12) United States Patent
Greenberg et al.

(10) Patent No.: US 12,791,137 B2
(45) Date of Patent: Nov. 10, 2026

(54) WATER HAMMER REDUCER

(71) Applicants: Marmon Foodservice Technologies, Inc., Osseo, MN (US); Cornelius (Tianjin) Co., Ltd., Tianjin (CN)

(72) Inventors: Jacob C. Greenberg, Elgin, IL (US); Yulong Liu, Tianjin (CN); Wei Xing, Tianjin (CN); Peiwen Wang, Tianjin (CN); Wenbin Xu, Tianjin (CN); Peiyuan Yang, Tianjin (CN); Tinghao Chen, Tianjin (CN)

(73) Assignees: Marmon Foodservice Technologies, Inc., Osseo, MN (US); Cornelius (Tianjin) Co., Ltd., Tianjin (CN)

( * ) Notice: Subject to any disclaimer, the term of this patent is extended or adjusted under 35 U.S.C. 154(b) by 146 days.

(21) Appl. No.: 18/918,479

(22) Filed: Oct. 17, 2024

(65) Prior Publication Data

US 2025/0129872 A1 Apr. 24, 2025

(30) Foreign Application Priority Data

Oct. 20, 2023 (CN) ......................... 202322825893.0

(51) Int. Cl.
*F16L 55/055* (2006.01)
*B67D 1/00* (2006.01)

(52) U.S. Cl.
CPC .......... *F16L 55/055* (2013.01); *B67D 1/0081* (2013.01); *B67D 2210/00049* (2013.01); *B67D 2210/00104* (2013.01)

(58) Field of Classification Search
CPC ................. F16L 55/055; B67D 1/0081; B67D 2210/00049; B67D 2210/00104; B67D 2001/0093
See application file for complete search history.

(56) References Cited

U.S. PATENT DOCUMENTS

| | | | | |
|---|---|---|---|---|
| 2,427,429 | A | 9/1947 | Waite | |
| 4,300,359 | A * | 11/1981 | Koeneman | F25C 5/18 62/379 |
| 7,077,290 | B2 | 7/2006 | Bethuy | |
| 7,784,652 | B2 | 8/2010 | Gaus | |
| 8,360,107 | B2 | 1/2013 | Schneider | |
| 9,266,708 | B2 | 2/2016 | Rasmussen | |
| 9,981,054 | B2 | 5/2018 | Johnson | |
| 10,676,336 | B2 | 6/2020 | Makino | |

(Continued)

FOREIGN PATENT DOCUMENTS

| | | | | |
|---|---|---|---|---|
| CN | 117781073 A | | 3/2024 | |
| ES | 2401994 T3 | * | 4/2013 | F25D 31/003 |

*Primary Examiner* — Donnell A Long
(74) *Attorney, Agent, or Firm* — Andrus Intellectual Property Law, LLP

(57) ABSTRACT

A gas infusion tank for a beverage machine includes a tank body defining a holding space for accommodating beverages. A mixing element includes a mixing chamber, an ascending pipe, and a descending pipe. A top of the ascending pipe is fluidly connected to the mixing chamber and a bottom of the ascending pipe has a liquid inlet. The liquid inlet is fluidly connected to the holding space. A top of the descending pipe is fluidly connected to the mixing chamber and a bottom of the descending pipe includes a liquid outlet in fluid communication with the nozzle. A gas intake hole connects the holding space with the mixing chamber.

20 Claims, 4 Drawing Sheets

(56) References Cited

U.S. PATENT DOCUMENTS

| | | | | |
|---|---|---|---|---|
| 10,889,480 | B2 | 1/2021 | Mitchell | |
| 10,899,596 | B2 | 1/2021 | Renzi | |
| 2014/0027540 | A1 * | 1/2014 | Newton | B05B 12/08 222/318 |
| 2014/0261696 | A1 | 9/2014 | Schreier | |
| 2017/0088410 | A1 * | 3/2017 | Wing | B67D 1/0076 |
| 2017/0183210 | A1 * | 6/2017 | Wyatt | B67D 1/0888 |
| 2018/0245582 | A1 | 8/2018 | Yang | |
| 2023/0356993 | A1 | 11/2023 | Fantappie | |
| 2024/0262671 | A1 * | 8/2024 | Njaastad | B67D 1/0065 |
| 2025/0059017 | A1 * | 2/2025 | Paauwe | B67D 1/0831 |

* cited by examiner

WATER HAMMER REDUCER

CROSS-REFERENCE TO RELATED APPLICATIONS

The present application claims priority of Chinese Patent Application No. 202322825893.0, filed on Oct. 20, 2023, and which granted on Aug. 20, 2024, as patent number ZL202322825893.0, the contents of which is hereby incorporated by reference in entirety.

FIELD OF THE DISCLOSURE

The present disclosure relates to the technical field of beverage dispensing machines. More specifically, the present disclosure relates addressing water hammer in beverage dispensing machines.

BACKGROUND

A water hammer effect is a phenomenon that occurs when a fluid in motion is forced to stop or change direction suddenly, causing a pressure surge or wave. When a valve at the outlet of a water pipe is closed, this pressure surge or wave occurs at the valve. That is, the water pressure at the valve quickly increases, which may cause component damage. The pressure wave of the water hammer effect also reflects within the system with waves impacting the valve multiple times. This can cause damage to the valve or other fluid system components or decrease longevity of such components.

BRIEF DISCLOSURE

A series of concepts in simplified form are introduced herein, which will be further explained in detail in the detailed description section. This section does not necessarily imply the scope of protection or the technical solution sought to be protected herein.

Examples of a water pipe assembly include an inlet pipeline having an inlet and configured to receive a fluid through the inlet. An outlet pipeline includes an outlet and is configured to permit the fluid to flow out the outlet. An intermediate pipeline is connected between the inlet pipeline and the outlet pipeline and configured for the fluid to flow from the inlet to the outlet through the intermediate pipeline. A valve is fluidly connected between the inlet pipeline and the outlet pipeline. The valve is configured to selectively permit flow though the valve from the outlet to the inlet.

Further examples of the water pipe assembly include a heat exchanger surrounding the intermediate pipeline and configured to thermally treat the fluid in the intermediate pipeline. The heat exchanger may be a cold plate that includes cast aluminum. A pressure relief pipeline is connected between the outlet pipeline and the inlet pipeline. The valve is disposed within the pressure relief pipeline. A length of the pressure relief pipeline is 4× or less than a diameter of the pressure relief pipeline. The valve may be a one-way check valve. The valve is a first valve and further including an auxiliary pipeline arranged in parallel to the valve between the inlet pipeline and the outlet pipeline. A second valve may be disposed within the auxiliary pipeline where the second valve is a manually-operated bypass valve.

In additional examples, the water pipe assembly further includes an inlet tee connector connected at the inlet at a first branch, a second branch of the inlet tee connector is connected to the valve, and a third branch of the inlet tee connector is configured to connect to a fluid supply. An outlet tee connector is connected at the outlet to a first branch, a second branch of the outlet tee connector is connected to the valve, and a third branch of the outlet tee connector is configured to connect to a dispensing valve. A plurality of water outlet branch pipes are connected to the outlet of the outlet pipeline and the valve is fluidly connected between the plurality of water outlet branch pipes and the inlet pipeline. An opening pressure of the valve does not exceed 5 PSI.

An example of a beverage machine includes an inlet pipeline having an inlet and configured to receive a fluid through the inlet. An outlet pipeline includes an outlet and configured to permit the fluid to flow out the outlet. At least one dispensing valve is fluidly connected to the outlet. An intermediate pipeline is connected between the inlet pipeline and the outlet pipeline and configured for the fluid to flow from the inlet to the outlet through the intermediate pipeline. A heat exchanger surrounds the intermediate pipeline and configured to thermally treat the fluid in the intermediate pipeline. A valve is fluidly connected between the inlet pipeline and the outlet pipeline. The valve is configured to selectively permit flow though the valve from the outlet to the inlet.

Additional examples of the beverage machine include the heat exchanger is a cold plate including cast aluminum. A flexible inlet tube is fluidly connected to the inlet. A flexible outlet tube is fluidly connected to the outlet. The flexible inlet tube is connected to a source of still water. The valve is connected to the flexible inlet tube and the flexible outlet tube. The valve is connected between the inlet and the outlet to selectively permit fluid flow from the flexible outlet tube to the flexible inlet tube through the valve. The beverage dispenser further includes a plurality of dispensing valves. The plurality of dispensing valves include the at least one dispensing valve. The flexible outlet tube includes a plurality of branches to connect the outlet to each of the plurality of dispensing valves. An inlet tee connector is connected to the inlet at a first branch, a second branch of the inlet tee connector is connected to the valve, and a third branch of the inlet tee connector is connected to the flexible inlet tube and is configured to connect to a fluid supply. An outlet tee connector is connected to the outlet at a first branch, a second branch of the outlet tee connector is connected to the valve, and a third branch of the outlet tee connector is connected to the dispensing valve through the flexible outlet tube. A pressure relief pipeline is connected between the outlet pipeline and the inlet pipeline. The valve is disposed within the pressure relief pipeline and a length of the pressure relief pipeline is 4× or less than a diameter of the pressure relief pipeline. The valve may be a one-way check valve.

BRIEF DESCRIPTION OF THE DRAWINGS

The following drawings of the application are hereby considered as part of the disclosure for understanding the disclosure. The following drawings and corresponding description thereof present non-limiting examples of embodiments of the present disclosure.

BRIEF DESCRIPTION OF REFERENCE NUMERALS OF THE DRAWINGS

Explanation of Reference Symbols

Figure 1:
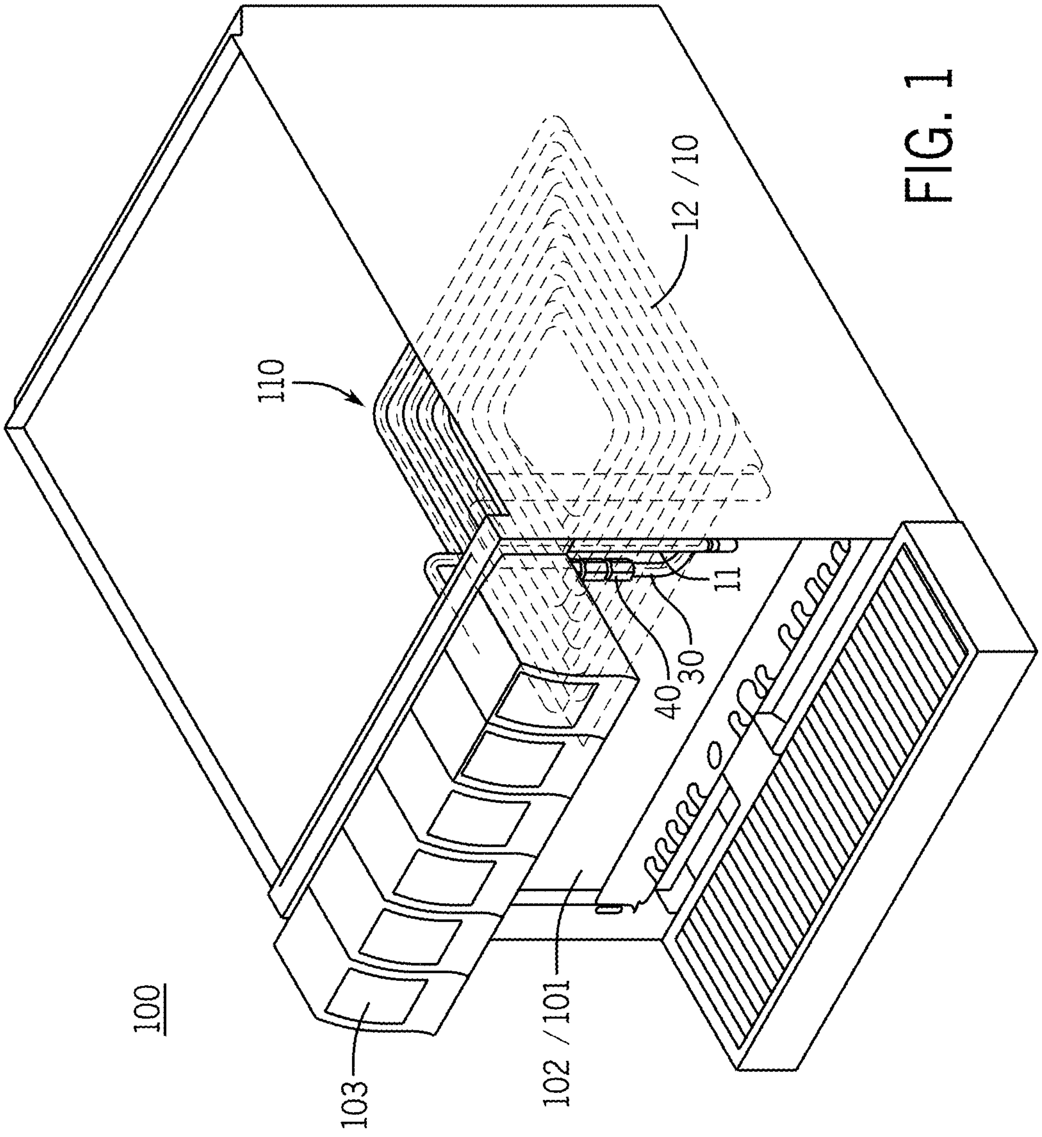
FIG. 1 is a schematic diagram of an example of a beverage machine.

10: main water pipe
11: water inlet pipeline
12: intermediate pipeline
13: water outlet pipeline
15: water inlet
16: water outlet
17: flexible outlet tube
18: flexible inlet tube
19: water-dividing node
20: connector
21: connector
30: pressure relief water pipe
40: one-way valve
42: manual bypass valve
50: heat exchanger
100: beverage machine
101: shell
102: front outer wall
103: beverage dispense valve
104: interior space
110: water pipe components

DETAILED DISCLOSURE

In the following description, numerous specific details are given in order to provide a more thorough understanding of the application. It will be apparent, however, to one skilled in the art that the present application may be practiced without one or more of these details. In other examples, some technical features known in the art are not described in order to avoid confusion with the present application. The preferred embodiments of the application are described in detail below, however, the present disclosure may have other embodiments in addition to those specifically described that are within the scope of the present disclosure.

For a thorough understanding of the present application, a detailed description will be set forth herein. It should be understood that these embodiments are provided so that this disclosure will be thorough and complete, and will fully convey the concepts of these exemplary embodiments to those of ordinary skill in the art. Implementation of the embodiments of the present application are not limited to specific details familiar to those skilled in the art. Examples are described in detail as follows. However, in addition to these detailed descriptions, the present application may also have other embodiments.

The ordinal words such as “first” and “second” are only identifications, and do not have any other meaning, such as a specific order, etc. Also, for example, the term “first element” itself does not imply the existence of a “second element”, and the term “second element” itself does not imply the existence of a “first element”.

It should be noted that the terms “upper”, “lower”, “back”, “left”, “right”, “inner”, “outer” and similar expression used in this application are for illustrative purposes only and are not limiting.

Figure 2:
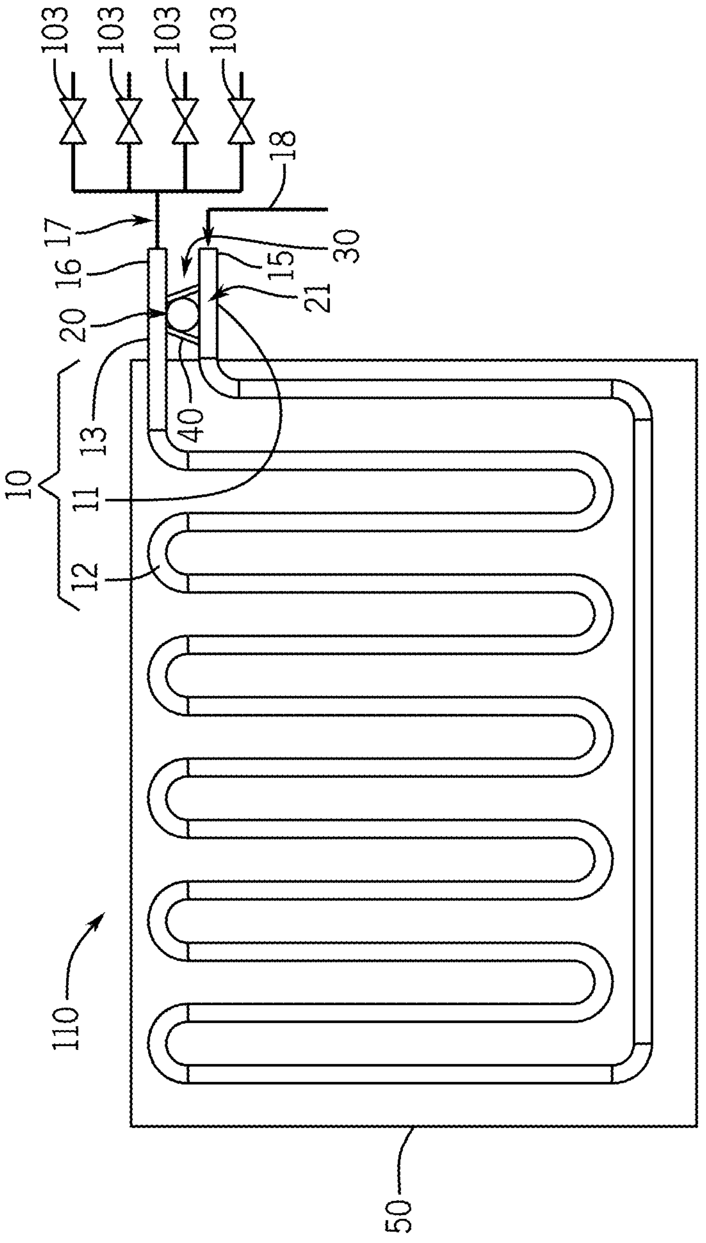
FIG. 2 is a schematic diagram of an example of a water circuit structure of the beverage machine.

This application provides a water pipe assembly and a beverage machine including the water pipe assembly. FIG. 1 depicts an example of a beverage machine 100, while FIG. 2 depicts the beverage machine 100 in a schematic diagram. According to the present application and includes a housing 101, at least one beverage dispense valve 103, and a water pipe assembly 110 as described herein. The beverage machine 100 includes a housing 101 defining an interior space 104. The beverage dispensing valve 103 is arranged on a front outer wall 102 of the housing 101. The water pipe assembly 110 is disposed in an installation space enclosed by the housing 101.

Figure 3:
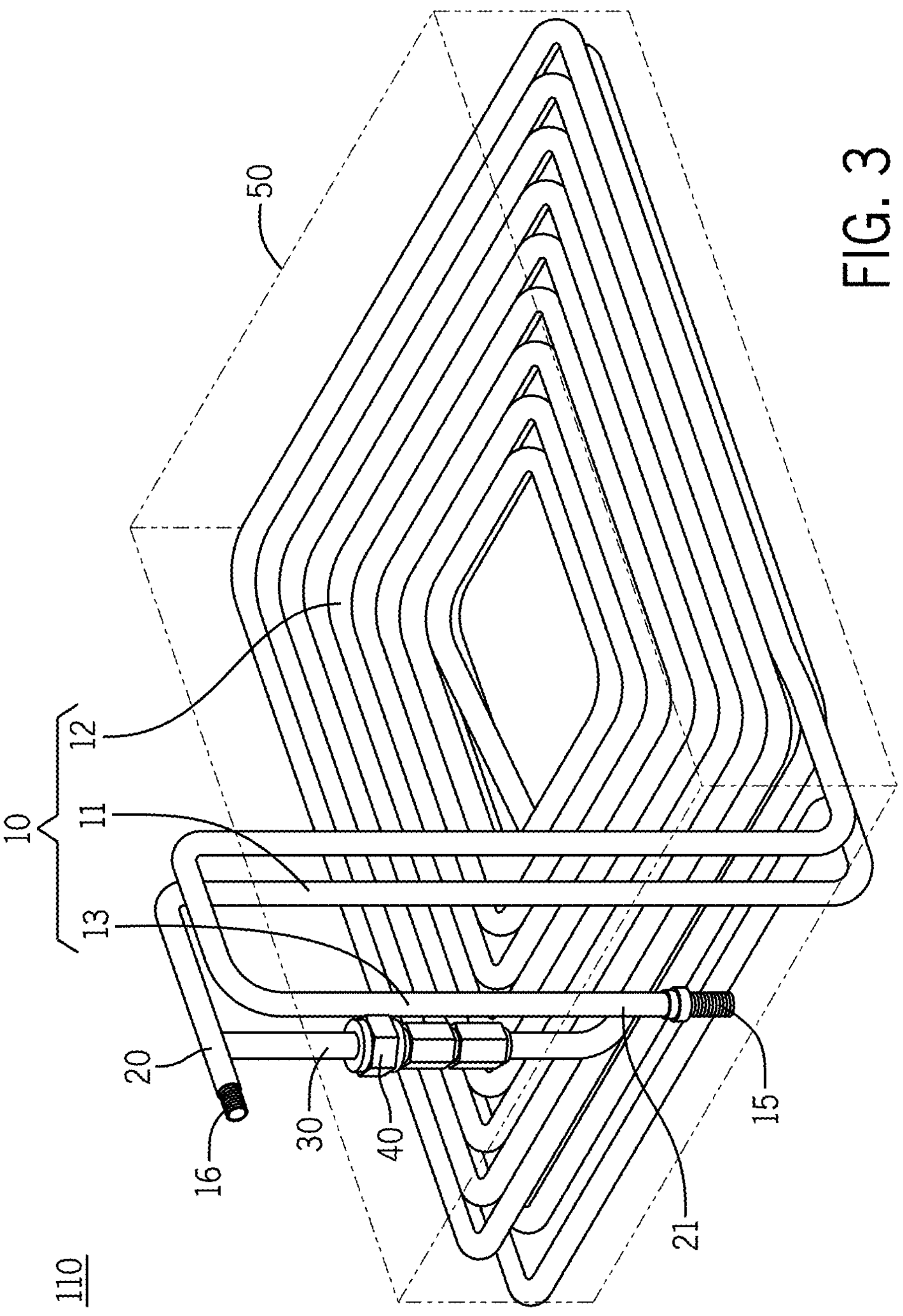
FIG. 3 is a schematic diagram of another example of the water circuit structure of the beverage machine.

FIG. 3 depicts a perspective view of an example of the water pipe assembly 110. The water pipe assembly 110 has at least one water outlet 16. The beverage dispensing valve 103 is provided at the water outlet 16, with an inlet of the beverage dispensing valve connected to the corresponding water outlet 16. Fluid lines, exemplarily flexible outlet tube 17 connects the outlet 16 of the water pipe assembly 110 to one or more beverage dispensing valves 103. The flexible outlet tube 17 is exemplarily constructed of vinyl or polyethylene terephthalate (PET) material which may offer some resiliency to pressure fluctuations. The water pipe assembly 110 operates as described herein to provide a diluent (such as still water or carbonated water) to the beverage dispensing valve 103 for preparing beverages. It will be recognized that the beverage dispensing valve 103 may be connected to multiple lines of fluid, including, but not limited to both still and carbonated water. Separate water pipe assemblies 110 (although only one is shown for simplicity) would be present to provide still and carbonated water to each dispensing valve 103. Additionally, the beverage dispensing valve 103 is exemplarily connected to multiple lines of flavoring (not depicted). The diluent fluid and the flavoring (such as syrups of different flavors) are combined at the beverage dispensing valve 103 and dispensed as a beverage.

The water pipe assembly 110 includes a main water pipe 10. The main water pipe 10 includes a inlet pipeline 11 which receives water at an inlet 15. The inlet pipeline 11 is connected to an intermediate pipeline 12, which will be described in further detail herein. The intermediate pipeline 12 is connected to an outlet pipeline 13 which includes the at least one outlet 16 as described above. Water is provided to the main water pipe 10 through the inlet 15.

The intermediate pipe exemplarily extends through a heat exchanger 50. Other examples of heat exchangers will be described in further detail herein, but in one example, the heat exchanger 50 is a cold plate of the beverage machine. In an example, the cold plate is a cast metal, exemplarily aluminum, about the intermediate pipeline 12 and any other similarly situated fluid (diluent or flavoring syrup) lines for use by the beverage machine. Ice for dispense from the beverage machine is stored in contact with the cold plate, and passively chills the cold plate and the fluid within the intermediate pipe(s) embedded therein.

However, as will be recognized from the present disclosure, flexibility and elasticity in the water pipe may help to dissipate the water hammer effect, but the cold plate presents a rigid and inelastic water pipe, which the inventors have found to increase the water hammer effect. A valve 40, presenting a pressure relief pipeline 30 is therefore connected between the inlet pipeline 11 and the outlet pipeline 13 of the main water pipe.

The valve 40 is exemplarily a one-way check valve. The one-way valve 40 is configured to selectively control the flow of water between the outlet pipeline 13 and the inlet pipeline 11, bypassing the intermediate pipeline 12. The valve 40 helps to define a pressure relief pipeline 30 between the outlet pipeline 13 and the inlet pipeline 11. In one example, the valve 40 selectively passes water in the outlet pipeline 13 from the outlet pipeline to the inlet pipeline through the pressure relief pipeline 30. This direction may be one-way after a predefined pressure in the outlet pipeline 13 is exceeded. That is to say, the pressure relief pipeline 30 adds a channel between the outlet pipeline 13 and the inlet pipeline 11 when a pressure threshold is exceeded within the outlet pipeline 13, flowing in the direction from the outlet pipeline 13 into the inlet pipeline 11. As described in further detail herein, the valve 40 may include additional controls or features to the selective control of fluid flow from the outlet pipeline 13 to the inlet pipeline 11.

When the beverage machine 100 is in operation, the beverage can be obtained by an actuation opening the beverage dispensing valve 103. This opens the outlet 16 and which creates a transitory drop in pressure and causes a flow of the diluent fluid through the main water pipe from the inlet 15 to the outlet 16. Subsequent closing of the beverage dispensing valve 103, creates an opposite transitory increase of pressure in the outlet pipeline 13 as the flowing diluent fluid can no longer pass out through the outlet 16. This transient pressure increase causes the water hammer effect will occur in the outlet pipeline 13. As noted, the flexibility and elasticity of the pipeline through which the diluent fluid flows can help to dissipate the water hammer pressure waves, however, a thermally efficient beverage dispenser minimizes any distance (and corresponding pipeline length) between the outlet pipeline 13 and the dispensing valve 103. Furthermore, the intermediate pipeline 12 is substantially longer, for example, at least 5-10× longer that either the inlet pipeline 11 or the outlet pipeline. The rigidity of the intermediate pipeline 12, and the heat exchanger in which is embedded, resist pressure wave dissipation, reflecting the pressure wave back into the outlet pipeline 13 towards the dispensing valve 103.

Instead, as presently disclosed, the rising water pressure in the outlet pipeline opens the valve 40 so that the outlet pipeline 13 of diluent fluid bypasses the intermediate pipeline 12 through the pressure relief pipeline 30 to the inlet pipeline 11. This bypasses the rigid length of the intermediate pipeline 12 to the inlet pipeline 11 and subsequently to the flexible inlet tube 18 which connects the fluid source to the inlet 15. The flexible inlet tube 18 is also exemplarily constructed of vinyl or polyethylene terephthalate (PET) material. This is equivalent to distributing the excess water pressure to the upstream of the water pipe assembly 110, so that the water pressure will not be concentrated into the water pipe assembly 110 and downstream thereof, thereby easing the pressure in the downstream outlet pipeline 13, and dispensing valve 103, that is, easing or weakening the water hammer effect at the dispensing valve 103 and outlet pipeline 13 and intermediate pipeline 12, which has a negative impact on these components due to vibration and subsequent damage to the components and joints therebetween.

The inventor of the present application found that when the dissolving base is water, the downstream water hammer effect is more significant than when the dissolving base is carbonated water. Therefore, especially when the dissolving base is water, the beverage machine 100 needs to be equipped with a valve 40 providing a pressure relief pipeline 30 as described above.

As noted above, in examples, the beverage machine 100, the liquid base in the main water pipe 10 needs to be cooled or heated. Therefore, the beverage machine 100 usually also includes heat exchanger 50 for heat exchange, exemplarily surrounding the intermediate pipeline 12. As described above, the heat exchanger 50 may be used to cool the intermediate pipeline. In another example of a heat exchanger 50 in addition to the cold plate described above, the heat exchanger 50 may be a box or tank filled with a relatively constant-temperature heat exchange medium is stored in box or tank, for example a tank, which stores relatively constant-temperature cold water or other heat exchange fluid like ethylene glycol. The intermediate pipeline 12 and/or other components of the main water pipe 10 are, for example, immersed in the cold water so that the liquid base therein is cooled by heat exchange fluid of the tank. Similarly, when heating is required, the tank is filled with a relatively constant-temperature hot heated heat exchange fluid. The main water pipe 10 is immersed in the hot fluid of the tank so that the liquid base inside is heated.

It can be understood that in this case, the main water pipe 10, and particularly the intermediate pipeline 12 usually is constructed of stainless steel and has a longer length compared to the flexible inlet tube 18 and the flexible outlet tube 17 on either end of the main water pipe 10. The length of the intermediate pipeline 12 within the heat exchanger 50 thereby facilitates sufficient heat exchange between the liquid within the intermediate pipeline 12 and the heat exchanger 50. For example, the length of the main water pipe 10 may be up to 10 meters, or longer such as 30 meters. The inner diameter of the main water pipe 10 usually does not exceed 10 mm, for example, 5-9 mm, or for example up to ⅜ inch. It is understandable that an increase in length or a decrease in inner diameter will lead to an increase in water pressure resulting from the water hammer effect. The intermediate pipeline 12 is exemplarily formed into a coiled or serpentine geometry to fit the longer length of tubing into a comparatively small area/volume of the heat exchanger 50. As a result, there is a pressure drop along the intermediate pipeline 12 as the fluid flows through the heat exchanger 50 which may provide further resistance to dissipation of a pressure wave from the water hammer effect. The line from the water supply to the beverage machine 100 and subsequently to the flexible inlet tube 18, is exemplarily constructed of a similar material as the flexible inlet tube 18 and can provide a further significant length of tubing where minor expansion of the flexible material thereof can aid in dissipation of the water hammer effect when the valve 40 allows the pressure wave to bypass the heat exchanger 50.

When the main water pipe 10 is long, it is preferable that the intermediate pipeline 12 is configured in the form of a coil (for example, coiled in an S shape in a plane, or coiled in a spiral form to form multiple turns) to maximize the surface area of the main water pipe 10 within the heat exchanger 50, to maximize heat exchange thermal treatment of the fluid base.

As previously described, a thermally-efficient beverage dispenser limits the distance from exiting the heat exchanger 50 to the dispensing valve 103. This includes shortening the lengths of the inlet pipeline 11 and the outlet pipeline 13. Additionally, it is advantageous to shorten the physical distance between the inlet pipeline and the outlet pipeline 13. In other words, the outlet pipeline 13 and the inlet pipeline 11 are arranged adjacently, thereby shortening the length of the pressure relief pipeline 30. In one example, the entirety of the pressure relief pipeline 30 is provided by the length of the valve 40. In other examples, the length of the pressure relief pipeline 30 is longer than the valve 40 itself. In such arrangements, the valve 40 may be located at an outlet end 32 of the pressure relief pipeline 30, at an inlet end 34 of the pressure relief pipeline 30, or at an intermediate location within the pressure relief pipeline 30.

As exemplarily shown in FIG. 3, the water pipe assembly 110 is configured such that at least part of some or all of the inlet pipeline 11, the pressure relief pipeline 30, and the outlet pipeline 13 extend in a same plane, such as extending in the same vertical plane. For example, the plane may be a vertical plane parallel to the front outer wall 102 of the beverage machine 100 (such as FIG. 1 shown). When the part of the inlet pipeline 11 connected to the pressure relief pipeline 30 and the pressure relief pipeline 30 both extend in a plane parallel to the front outer wall 102 of the beverage machine 100, the plane can be aligned with the front side while ensuring the performance of the beverage machine. The side outer walls 102 are as close as possible, so that the beverage dispensing valve 103 and the valve 40 are close to each other. This design can also make the beverage machine 100 more compact and save space.

As mentioned above, it can be seen that the present disclosure protects the beverage dispensing valve 103 from the water hammer effect. In order to fully unload the water hammer pressure in the entire pipeline, the valve 40 is best located close to the dispensing valve 103, and more specifically, near the outlet 16 of the outlet pipeline 13. In construction, outlet pipeline 13 and flexible outlet tube 17 are minimized in length and/or insulated to reduce any temperature change of the beverage upon exiting the heat exchanger 50/intermediate pipeline 12 until dispensed to the customer from the beverage dispensing valve 103. The valve 40 and pressure relief pipeline 30 connect to the outlet pipeline 13 at a connection 20, which is exemplarily located at the outlet 16. For example, the distance between the dispense valve 103 and the valve 40 along the waterway may be between 5 cm to 30 cm. As noted above, this connection between the dispensing valve 103 and the outlet 16 may be provided with flexible outlet tube 17. It can be understood that after closing the beverage dispensing valve 103, the water pressure in the pipeline between the beverage dispensing valve 103 and the valve 40 is comparatively high, so the shorter the distance between the beverage dispensing valve 103 and the valve 40 for high water pressure, the more water hammer dissipation benefit this arrangement will provide.

Similarly, water hammer protection of the main water pipe 10, including the outlet pipeline 13, intermediate pipeline 12, and inlet pipeline 11, is further provided by locating the valve 40 and/or pressure relief pipeline 30 at a connection 21 to the inlet pipeline near to the inlet 15. This minimizes any portions of the main water pipe 10 exposed to the water hammer effect, but rather diverts the water hammer pressure upstream from the outlet 16 to the inlet 15 and into the flexible inlet tube 18.

Figure 4:
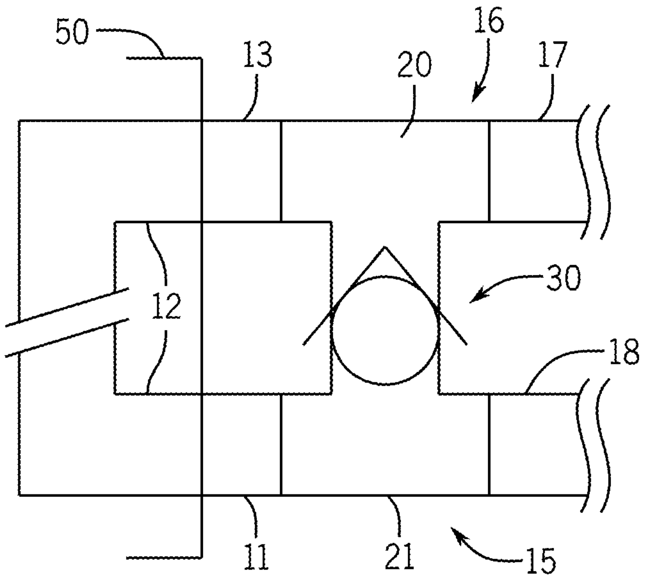
FIG. 4 is a schematic diagram of an example of the connection of the valve between the water pipe inlet and outlet.

FIG. 4 depicts a detailed version of one example of an arrangement of the valve 40 between the outlet pipeline 13 and the inlet pipeline 11. In the example, the lengths of the outlet pipeline 13 and the inlet pipeline 11 may be minimized. The outlet 16 is fitted with a tee connector as the connection 20. The tee connector connects to the outlet pipeline 13, the flexible outlet tube 17 and directly to the valve 40. Similarly, the inlet 15 is fitted with a tee connector as the connection 21. The tee connector connects to the inlet pipeline 11, the flexible inlet tube 18, and directly to the valve 40. The tee connectors 20, 21 thus provide the fittings to the valve 40 as well as to the respective flexible tubes 17, 18. Relatedly, an additional branch of the flexible outlet tube 17 to the dispensing valves 103 could instead route to the valve 40 connected at the connector 21 at the inlet 15. Likewise, the connectors 20, 21 may connect the valve 40 between the flexible tubes 17, 18 which in turn connect respectively to the inlet 15 and the outlet 16. It will be noted that if no means of bypass of the valve 40 is provided, any length of pipeline 30 between the outlet pipeline 13 and the inlet pipeline 11 including the valve 40 may be considered to be a "dead leg" by plumbing standards. These standards may thus limit the length of pipeline 30 to be between 1.5×-4.0× the inner diameter of the pipeline 30. One implementation of the above may include the integration of the valve 40 into a manifold (not depicted) connecting the inlet 15, outlet 16, flexible inlet tube 18, and flexible outlet tube 17 (or tubes) extending to one or more dispensing valves 103.

In an example, the valve 40 and the pressure relief pipeline 30 are wrapped with one or more pieces of insulation to limit any thermal change in the temperature of the base fluid flowing back to the inlet pipeline 11. The insulation component may be, for example, a thermal insulation sleeve or other component with thermal insulation and thermal insulation functions. In this application, the base fluid returned after pressure relief will cycle through the heat exchanger again 50 to ensure consistent quality of the beverage.

The beverage machine 100 is usually provided with a plurality of beverage dispensing valves 103 to provide beverages of various flavors. Therefore, as shown in FIG. 1, the beverage machine 100 is correspondingly provided with a plurality of lines, which may exemplarily be flexible outlet tubes 17 connected to the outlet 16 of the outlet pipeline 13. Each of the plurality of lines may be connected to a different beverage dispensing valve 103 for the provision of a plurality of different beverages. It will be recognized that the valve 40 and pressure relief pipeline can be fluidly connected to or near the outlet 16, or may be connected to one or more of the lines downstream of the outlet 16.

The pressure relief pipeline 30 can be configured as a tube (such as a soft plastic pipe) or a rigid pipe (such as a metal water pipe) according to specific needs. Preferably, the inner diameter of the pressure relief pipeline does not exceed 10 mm, for example, 5-9 mm.

In order to enable the one-way valve 40 to respond quickly, in an example, the valve 40 is configured as a purely mechanical one-way valve. The opening pressure of valve 40 does not exceed 5 PSI. More preferably, the opening pressure of valve 40 does not exceed 1 PSI. Therefore, when the water pressure in the outlet pipeline 13 is higher than the water pressure in the inlet pipeline 11, the valve 40 can act in time to divert the high-pressure liquid downstream back to the upstream. Typically, when a beverage machine is used, the average flow rate of beverages in the water pipe assembly 110 is about 75 ml/s, and the valve 40 is configured to withstand a working pressure of 300 PSI. In examples, the water hammer effect was found to exhibit a peak pressure of about 230 PSI with a series of diminishing subsequent pressure waves. However, after implementation of the system as described above, the water hammer peak pressure between 120-140, or between 124-137, or between 125-135 PSI, along with fewer subsequent notable pressure waves. In an example, the valve 40 is threadedly connected to the pressure relief pipeline 30, so that the connection between the two can withstand greater water pressure.

The valve 40 has been generally described above as a passive, mechanical, check valve that opens upon a predefined pressure differential between the outlet pipeline 13 and the inlet pipeline 11. However, it will be recognized that other kinds of valves or a combination of valves may be used in the position of valve 40. Additional combinations or types of valves may be additionally helpful in ensuring that water is not trapped within the valve 40 or the pressure relief pipeline 30. In one example, the valve may include an electrical override the valve 40 includes an electrical override and is communicatively connected to a controller of the beverage machine 100. On a regular interval, the controller operates the valve 40 to open during a dispense operation which provides a secondary path for enough fluid flow to ensure that the valve 40 and pressure relief pipeline 30 remain clean, but without dispensing such volume so as to diminish the temperature of the dispensed beverage. In a still further example, the valve 40 may be a bi-directional check valve, one which is normally closed, but opens in either direction in the presence of the predetermined pressure differential (or differentials if different between valve directions). Such a bi-directional check valve would operate in the same manner as described above to mitigate the water hammer effect, but also in response to added pressure to the inlet pipeline 11, would operate to open, flushing the valve and the pressure relief pipeline. In one example, this may include a secondary valve in the inlet pipeline 11 which is electrically operable based upon a signal from the controller of the beverage dispenser to restrict or close the flow path into the intermediate pipeline 12, and increasing the differential pressure across the valve 40 when the dispensing valve 103 opens.

Figure 5:
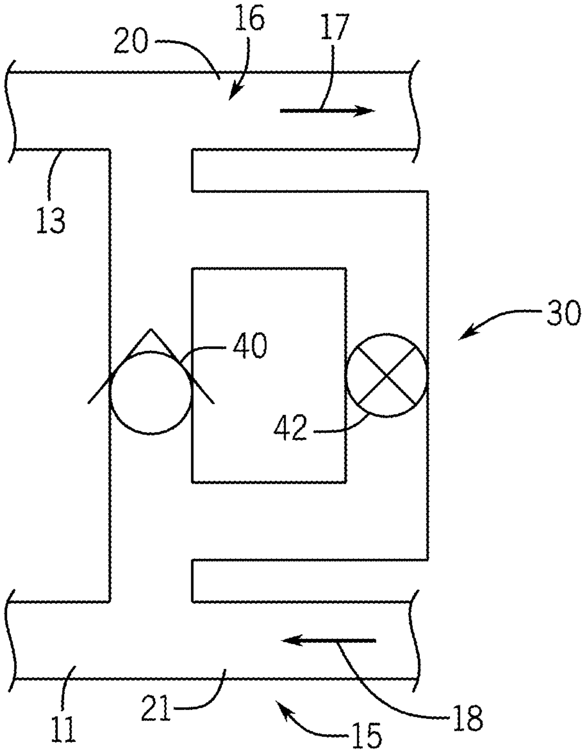
FIG. 5 is a schematic diagram of an example of the valve 40 with a bypass valve.

FIG. 5 provides an auxiliary pipeline 44 arranged in parallel to the valve 40. A manual bypass valve 42 is arranged in the auxiliary pipeline 44. The bypass valve 42 may be opened, for example, to bleed air out when the beverage machine 100 is put into service and/or for periodic system flushes for performance and cleaning purposes. It may be intended or otherwise desirable to provide a water system free from any air as air in the water system may degrade performance and provide a source of contamination within the water system. The bypass valve 42 may bypass the valve 40 to enable the water system to be fully flooded during setup as, when open, the valve 42 would direct incoming water to bypass the heat exchanger and fill the pressure relief pipeline 30. When the valve 42 is closed, the valve 40 would operate as described above for the hammer reduction purposes.

It can be understood that no matter what the purpose of the main water pipe 10 is, as long as its length, inner diameter, and flow rate of the liquid flowing through it reach a certain level, a serious water hammer effect will be formed downstream. Therefore, the water pipe assembly 110 according to the present application is suitable for any occasion where the water hammer effect needs to be mitigated or reduced. This includes equipment other than beverage machines, such as pharmaceutical or reagent preparation equipment, chemical equipment, water conservancy equipment, etc.

The water pipe assembly according to the present application can effectively alleviate the water hammer effect downstream of the water pipe. It can be understood that the beverage machine according to the present application includes all the features and effects of the water pipe assembly according to the present application.

The processes and steps described in all the above preferred embodiments are only examples. Unless adverse effects occur, various processing operations may be performed in an order different from that of the above flow. The sequence of steps in the above process can also be added, combined or deleted according to actual needs.

In understanding the scope of this application, the term "comprising" and its derivatives as used herein are intended to be open-ended terms that designate the presence of recited features, elements, parts, groups, integers and/or steps, However, the existence of other unrecorded features, elements, parts, groups, integers and/or steps is not excluded. This concept also applies to words with similar meanings, such as the terms "include", "have" and their derivatives.

As used herein, the terms "attached" or "attached" include constructions in which one element is directly secured to another element by being secured directly to the other element; and one is secured by being secured to intermediate members which in turn are A structure in which an element is indirectly fixed to another element by being fixed to another element; and a structure in which one element is integral with another element, that is, one element is essentially a part of another element. This definition also applies to words with similar meanings such as "connect," "join," "couple," "mount," "glue," "fix" and their derivatives. Finally, terms of degree such as "substantially," "approximately," and "approximately" as used herein mean an amount of deviation that modifies the term such that the end result does not significantly change.

Unless otherwise defined, technical and scientific terms used herein have the same meaning as commonly understood by one of ordinary skill in the technical field of this application. The terminology used herein is for the purpose of describing specific implementations only and is not intended to limit the application. Features described herein in one embodiment may be applied to another embodiment alone or in combination with other features, unless the feature is inapplicable in that other embodiment or otherwise stated.

The present application has been described through the above-mentioned embodiments, but it should be understood that the above-mentioned embodiments are only for the purpose of illustration and illustration, and are not intended to limit the present application to the scope of the described embodiments. In addition, those skilled in the art can understand that the present application is not limited to the above-described embodiments, and more variations and modifications can be made based on the teachings of the present application. These variations and modifications all fall within the scope of protection claimed by the present application. within range.

Citations to a number of references are made herein. The cited references are incorporated by reference herein in their entireties. In the event that there is an inconsistency between a definition of a term in the specification as compared to a definition of the term in a cited reference, the term should be interpreted based on the definition in the specification.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives, and modifications are possible within the scope of the appended claims.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

This written description uses examples to disclose the invention, including the best mode, and also to enable any person skilled in the art to make and use the invention. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A water pipe assembly, comprising:
- an inlet pipeline comprising an inlet and configured to receive a fluid through the inlet;
- an outlet pipeline comprising an outlet and configured to permit the fluid to flow out the outlet;
- an intermediate pipeline connected between the inlet pipeline and the outlet pipeline and configured for the fluid to flow from the inlet to the outlet through the intermediate pipeline; and
- a valve fluidly connected between the inlet pipeline and the outlet pipeline bypassing the intermediate pipeline, and the valve is configured to selectively permit flow though the valve from the outlet to the inlet.

2. The water pipe assembly of claim 1, further comprising a heat exchanger surrounding the intermediate pipeline and configured to thermally treat the fluid in the intermediate pipeline.

3. The water pipe assembly of claim 2, wherein the heat exchanger is a cold plate comprising cast aluminum.

4. The water pipe assembly of claim 2, further comprising a pressure relief pipeline connected between the outlet pipeline and the inlet pipeline, wherein the valve is disposed within the pressure relief pipeline.

5. The water pipe assembly of claim 4, wherein a length of the pressure relief pipeline is 4× or less than a diameter of the pressure relief pipeline.

6. The water pipe assembly of claim 2, wherein the valve is a one-way check valve.

7. The water pipe assembly of claim 6, wherein the valve is a first valve and further comprising an auxiliary pipeline arranged in parallel to the valve between the inlet pipeline and the outlet pipeline, wherein a second valve is disposed within the auxiliary pipeline, the second valve being a manually-operated bypass valve.

8. The water pipe assembly of claim 2, further comprising:
- an inlet tee connector connected at the inlet at a first branch, a second branch of the inlet tee connector is connected to the valve, and a third branch of the inlet tee connector is configured to connect to a fluid supply; and
- an outlet tee connector connected at the outlet at a first branch, a second branch of the outlet tee connector is connected to the valve, and a third branch of the outlet tee connector is configured to connect to a dispensing valve.

9. The water pipe assembly of claim 2, further comprising:
- a plurality of water outlet branch pipes connected to the outlet of the outlet pipeline;
- wherein the valve is fluidly connected between the plurality of water outlet branch pipes and the inlet pipeline.

10. The water pipe assembly according to claim 2, wherein an opening pressure of the valve does not exceed 5 PSI.

11. A beverage machine comprising:
- an inlet pipeline comprising an inlet and configured to receive a fluid through the inlet;
- an outlet pipeline comprising an outlet and configured to permit the fluid to flow out the outlet;
- at least one dispensing valve fluidly connected to the outlet;
- an intermediate pipeline connected between the inlet pipeline and the outlet pipeline and configured for the fluid to flow from the inlet to the outlet through the intermediate pipeline;
- a heat exchanger surrounding the intermediate pipeline and configured to thermally treat the fluid in the intermediate pipeline; and
- a valve fluidly connected between the inlet pipeline and the outlet pipeline bypassing the intermediate pipeline, and the valve is configured to selectively permit flow though the valve from the outlet to the inlet.

12. The beverage machine of claim 11, wherein the heat exchanger is a cold plate comprising cast aluminum.

13. The beverage machine of claim 11, further comprising:
- a flexible inlet tube fluidly connected to the inlet; and
- a flexible outlet tube fluidly connected to the outlet.

14. The beverage machine of claim 13, wherein the flexible inlet tube is connected to a source of still water.

15. The beverage machine of claim 13, wherein the valve is connected to the flexible inlet tube and the flexible outlet tube.

16. The beverage machine of claim 13, wherein the valve is connected between the inlet and the outlet to selectively permit fluid flow from the flexible outlet tube to the flexible inlet tube through the valve.

17. The beverage machine of claim 13, further comprising:
- a plurality of dispensing valves, the plurality of dispensing valves comprising the at least one dispensing valve;
- wherein the flexible outlet tube comprises a plurality of branches to connect the outlet to each of the plurality of dispensing valves.

18. The beverage machine of claim 13, further comprising:
- an inlet tee connector connected at the inlet at a first branch, a second branch of the inlet tee connector is connected to the valve, and a third branch of the inlet tee connector is connected to the flexible inlet tube and is configured to connect to a fluid supply; and
- an outlet tee connector connected at the outlet at a first branch, a second branch of the outlet tee connector is connected to the valve, and a third branch of the outlet tee connector is connected to dispensing valve through the flexible outlet tube.

19. The beverage machine of claim 11, further comprising a pressure relief pipeline connected between the outlet pipeline and the inlet pipeline, wherein the valve is disposed within the pressure relief pipeline and a length of the pressure relief pipeline is 4× or less than a diameter of the pressure relief pipeline.

20. The beverage machine of claim 11, wherein the valve is a one-way check valve.

* * * * *